United States Patent
Ishihara

(10) Patent No.: US 9,453,961 B2
(45) Date of Patent: Sep. 27, 2016

(54) IMAGE PICKUP APPARATUS

(71) Applicant: CANON KABUSHIKI KAISHA, Tokyo (JP)

(72) Inventor: Keiichiro Ishihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/740,769

(22) Filed: Jun. 16, 2015

(65) Prior Publication Data
US 2015/0370011 A1 Dec. 24, 2015

(30) Foreign Application Priority Data

Jun. 18, 2014 (JP) ................................. 2014-125724

(51) Int. Cl.
| | |
|---|---|
| H04N 5/225 | (2006.01) |
| G02B 6/06 | (2006.01) |
| G02B 13/18 | (2006.01) |
| F21V 8/00 | (2006.01) |
| G02B 9/60 | (2006.01) |
| G02B 13/06 | (2006.01) |

(52) U.S. Cl.
CPC ............... *G02B 6/06* (2013.01); *G02B 6/0005* (2013.01); *G02B 13/18* (2013.01); *H04N 5/2253* (2013.01); *H04N 5/2254* (2013.01); *G02B 6/0016* (2013.01); *G02B 9/60* (2013.01); *G02B 13/06* (2013.01)

(58) Field of Classification Search
CPC .. H04N 5/2253; H04N 5/2254; G02B 1/045; G02B 6/00; G02B 6/06; G02B 6/0005; G02B 6/0016; G02B 9/60; G02B 13/18
USPC ............................ 348/207.99, 345, 374–375
See application file for complete search history.

(56) References Cited

U.S. PATENT DOCUMENTS

| | | | | |
|---|---|---|---|---|
| 5,554,850 A | * | 9/1996 | Hejazi ................... | G01T 1/2018 250/367 |
| 5,633,967 A | * | 5/1997 | Haruta ................... | B23K 26/06 385/33 |
| 2004/0179722 A1 | * | 9/2004 | Moritoki ................. | G02B 6/06 382/124 |
| 2015/0370012 A1 | * | 12/2015 | Ishihara ................... | G02B 6/06 348/308 |
| 2016/0089749 A1 | * | 3/2016 | Mori ................... | B23K 26/0648 219/121.75 |

FOREIGN PATENT DOCUMENTS

JP    10-253841 A    9/1998

* cited by examiner

*Primary Examiner* — Ngoc-Yen Vu
(74) *Attorney, Agent, or Firm* — Canon U.S.A. Inc., IP Division

(57) ABSTRACT

An image pickup apparatus includes an imaging optical system; an image pickup device; and an optical fiber bundle constituted by plural optical fibers configured to guide light from the imaging optical system to the image pickup device. A light incident surface of the optical fiber bundle is concave with respect to the imaging optical system. An optical fiber distant from an optical axis of the imaging optical system satisfies:

$$\beta + \sin^{-1}\left[\frac{\sin(\omega - \beta)}{N1}\right] - \cos^{-1}\left(\frac{N2}{N1}\right) \leq \alpha < \omega$$

where α is an inclination angle of the optical fiber with respect to the optical axis, β is an inclination angle of the light incident surface with respect to the optical axis, ω is an angle, with respect to the optical axis, of a principal ray from the imaging optical system incident on the optical fiber, N1 is a refractive index of a core of the optical fiber, and N2 is a refractive index of a clad of the optical fiber.

13 Claims, 6 Drawing Sheets

IMAGE PICKUP APPARATUS

BACKGROUND OF THE INVENTION

1. Field of the Invention

The present invention relates to an image pickup apparatus.

2. Description of the Related Art

An image pickup apparatus (i.e., an imaging optics apparatus) configured to guide light (i.e., a ray of imaging light) from an imaging optical system (i.e., an imaging optical unit) to an image pickup device using an optical fiber bundle constituted by a plurality of optical fibers has been developed. Japanese Patent Laid-Open No. 10-253841 discloses an imaging optics apparatus that transmits an ray of imaging light by an imaging optical unit incident on a light receiving end surface (i.e., a light incident surface) to an image detecting unit (i.e., an image pickup device) using an optical fiber bundle. In this imaging optics apparatus, the light receiving end surface of the optical fiber bundle is located on an imaging surface of the imaging optical unit, and a surface shape of the light receiving end surface is made to be the same as that of imaging surface.

As disclosed in Japanese Patent Laid-Open No. 10-253841, the light receiving end surface of the optical fiber bundle constituted by optical fibers of which axial directions are parallel to an optical axis of the imaging optical unit is a concave surface. However, since the light receiving end surface of each optical fiber is inclined, light propagating inside the optical fiber becomes difficult to satisfy a total reflection condition, and transmittance of the optical fiber of a light bundle of a wide view angle of the imaging optical unit is reduced. Therefore, light quantity of pixels in a peripheral portion of the image pickup device may be reduced.

SUMMARY OF THE INVENTION

An image pickup apparatus, according to an aspect of the present invention, includes an imaging optical system; an image pickup device; and an optical fiber bundle constituted by a plurality of optical fibers configured to guide light from the imaging optical system to the image pickup device, wherein a light incident surface of the optical fiber bundle is a concave surface with respect to the imaging optical system, an optical fiber distant from an optical axis of the imaging optical system among the plurality of optical fibers satisfies the following Expression:

$$\beta + \sin^{-1}\left[\frac{\sin(\omega - \beta)}{N1}\right] - \cos^{-1}\left(\frac{N2}{N1}\right) \leq \alpha < \omega$$

where α is an inclination angle of the optical fiber with respect to the optical axis of the imaging optical system, β is an inclination angle of the light incident surface of the optical fiber with respect to the optical axis of the imaging optical system, ω is an angle, with respect to the optical axis of the imaging optical system, of a principal ray from the imaging optical system incident on the optical fiber, N1 is a refractive index of a core of the optical fiber, and N2 is a refractive index of a clad of the optical fiber.

Further aspects of the present invention will become apparent from the following description of exemplary embodiments with reference to the attached drawings.

DESCRIPTION OF THE EMBODIMENTS

Embodiments are described below, but the invention is not limited to the configurations thereof.

First Embodiment

Figure 1A:
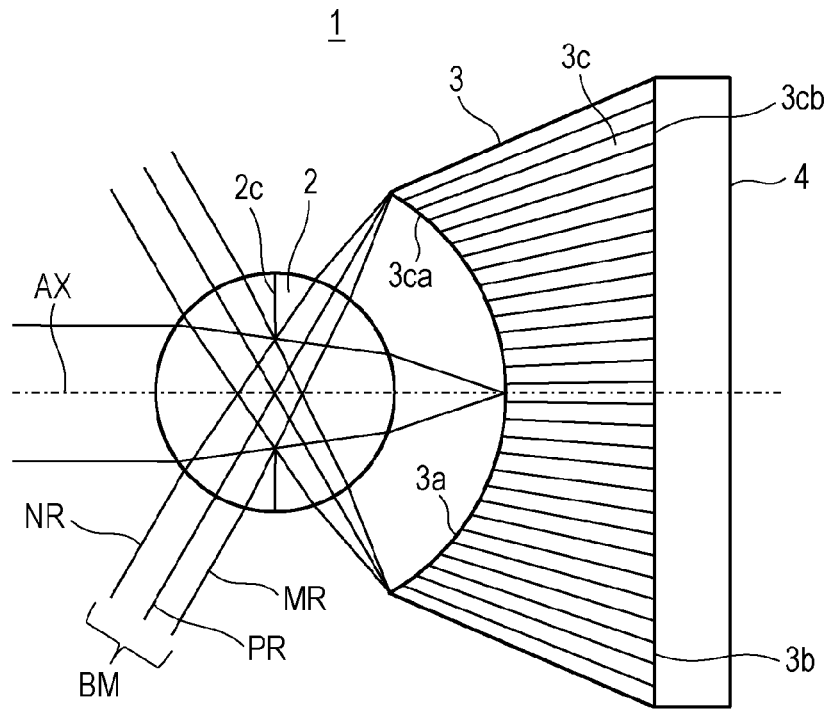
FIG. 1A is a schematic diagram illustrating an exemplary image pickup apparatus according to a first embodiment.

FIG. 1A is a schematic diagram illustrating an exemplary image pickup apparatus according to the present embodiment. An image pickup apparatus 1 according to the present embodiment includes a ball lens 2 (spherical lens) as an imaging optical system (i.e., imaging optics), an optical fiber bundle 3 as an image transmitting unit, and a sensor 4 as an image pickup device. The ball lens 2, the optical fiber bundle 3, and the sensor 4 are arranged such that an image formed by the ball lens 2 is transmitted to the sensor 4 by the optical fiber bundle 3. The optical fiber bundle 3 is constituted by a plurality of optical fibers 3c that guide light from the ball lens 2 to the sensor 4. Specifically, each optical fiber 3c receives image pickup light BM via the ball lens 2, lets the image pickup light BM propagate inside the optical fiber 3c, and guides the image pickup light BM to each pixel of the sensor 4. The image pickup light BM is light that may enter into the optical fiber 3c through an aperture of a diaphragm 2c. The image pickup light BM includes a principal ray PR passing through the center of the aperture of the diaphragm 2c, an upper marginal ray NR and a lower marginal ray MR defined by the aperture of the diaphragm 2c.

The light incident surface 3a of the optical fiber bundle 3 is a concave surface with respect to the ball lens 2 and, more specifically, has substantially the same concave shape as that of an imaging surface of the ball lens 2. In the light incident surface 3a of the optical fiber bundle 3, a smooth optical surface is formed by the same spherical surface polishing as that performed on a glass lens. This polishing technique can reduce scattering caused on the surface of the light incident surface 3a. A light emitting surface 3b of the optical fiber bundle 3 has a planar shape. The optical fiber bundle 3 is disposed so that the light emitting surface 3b and the light incident surface of the sensor 4 are in close contact with each other. An optical surface is formed on the light emitting surface 3b of the optical fiber bundle 3 by planar surface polishing, as in the light incident surface 3a, and adhesiveness of the light emitting surface 3b to the image pickup device is increased.

Each optical fiber 3c located in the peripheral portion of the optical fiber bundle 3 is configured such that an axial direction of the optical fiber 3c is inclined with respect to an optical axis AX, and the inclination angle thereof is set to be in a desired range as described later. With this configuration, a decrease in transmittance of the optical fiber 3c in the peripheral portion of the optical fiber bundle 3 is reduced.

The optical axis AX of the ball lens 2 is a straight line that passes through the center of the aperture defined by the diaphragm 2c disposed in the ball lens 2; the optical axis AX is perpendicular to a light-receiving surface of the sensor 4. The center of the aperture of the diaphragm 2c corresponds to the center of an exit pupil of the ball lens 2 and, therefore, the optical axis AX may also be considered as a straight line that passes through the center of the exit pupil of the imaging optical system, and the optical axis AX is perpendicular or orthogonal or normal to the light-receiving surface of the sensor 4. The optical axis AX passes through the center of the light incident surface 3a of the optical fiber bundle 3. That is, the straight line that connects the center of the exit pupil of the imaging optical system and the center of the light incident surface 3a of the optical fiber bundle 3 corresponds to the optical axis AX.

Figure 1B:
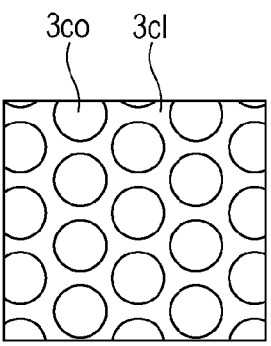
FIG. 1B is a schematic diagram illustrating a part of a cross section of an optical fiber bundle of the image pickup apparatus according to the first embodiment in a direction parallel to a light-receiving surface of a sensor.

FIG. 1B is a partial view of a cross section of the optical fiber bundle 3 parallel to the light-receiving surface of the sensor 4. In this cross section, cores 3co are arranged in a triangular grid pattern, and a clad 3cl is disposed between the cores 3co. Thus, each optical fiber 3c is constituted by the cores 3co and the clad 3cl disposed around the cores 3co. In FIG. 1B, the cores 3co are arranged in a triangular grid pattern, but the invention is not limited to such arrangement. The cores 3co may be arranged in any grid pattern, such as a square grid pattern and a diagonal grid pattern. As long as the clad 3cl is disposed to surround the cores 3co, the cores 3co may be arranged randomly. Alternatively, an optical fiber bundle having simultaneously a region in which the cores 3co are arranged in a grid pattern and a region in which the cores 3co are arranged randomly may also be used.

Each optical fiber 3c of the optical fiber bundle 3 may or may not correspond to each pixel of the sensor 4 on a one-to-one basis. For example, some light components of the image pickup light BM propagating inside the optical fiber 3c may be received by some pixels of the sensor 4, and other light components may be received by other pixels of the sensor 4. Alternatively, some pixels of the sensor 4 may receive the image pickup light BM that has propagated each of a plurality of optical fibers 3c.

In the present embodiment, the diameter of the core 3co on the side of the light emitting surface 3cb of the optical fiber 3c is set to be larger than the diameter of the core 3co on the side of the light incident surface 3ca of the optical fiber 3c. With this configuration, the inclination angle of the optical fiber 3c may be easily controlled to a desired value. As described in the embodiments below, the present embodiment is applicable if the diameter of the core 3co on the side of the light emitting surface 3cb is the same as that of the diameter of the core 3co on the side of the light incident surface 3ca.

Figure 2A:
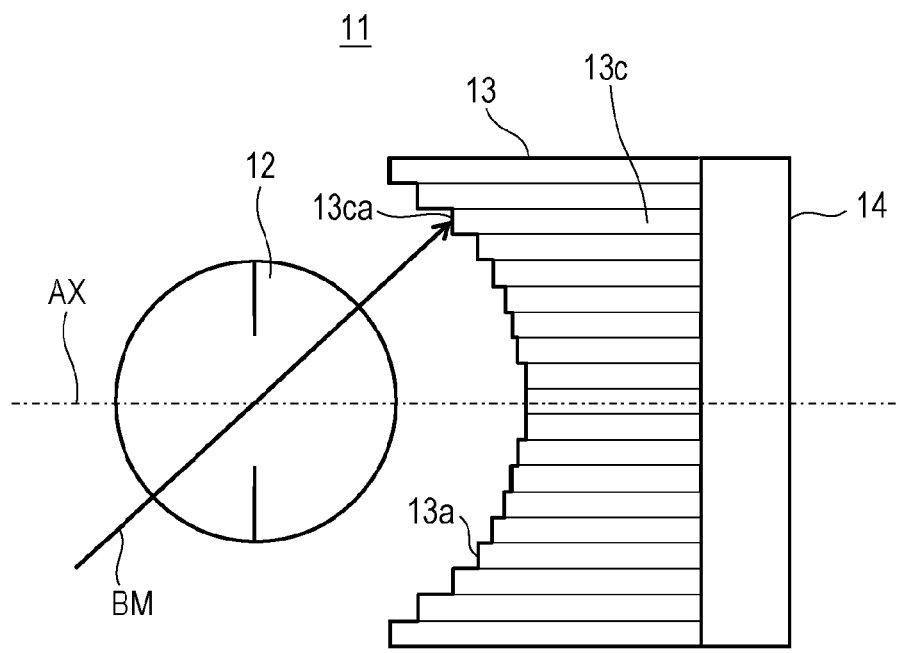
FIG. 2A is a schematic diagram illustrating a typical image pickup apparatus.

Next, a state in which light propagates inside a typical optical fiber is described with reference to FIGS. 2A and 2B. FIG. 2A is a schematic diagram of an image pickup apparatus 11. The image pickup apparatus 11 includes a ball lens 12 as an imaging optical system, an optical fiber bundle 13, and a sensor 14 as an image pickup device. The optical fiber bundle 13 includes a plurality of optical fibers 13c. Each axial direction of each optical fiber 13c is parallel to the optical axis AX of the ball lens 12 and is perpendicular to a light-receiving surface of the sensor 14. A light incident surface 13ca of each optical fiber 13c is disposed perpendicular to the axial direction of the optical fiber 13c. The position of each light incident surface 13ca of each optical fiber 13c is adjusted to correspond to an imaging surface of the ball lens 12. Therefore, positions of the light incident surfaces 13ca of the optical fibers 13c differ as illustrated in FIG. 2A in the direction parallel to the optical axis AX depending on the distance from the optical axis AX of the ball lens 12.

Figure 2B:
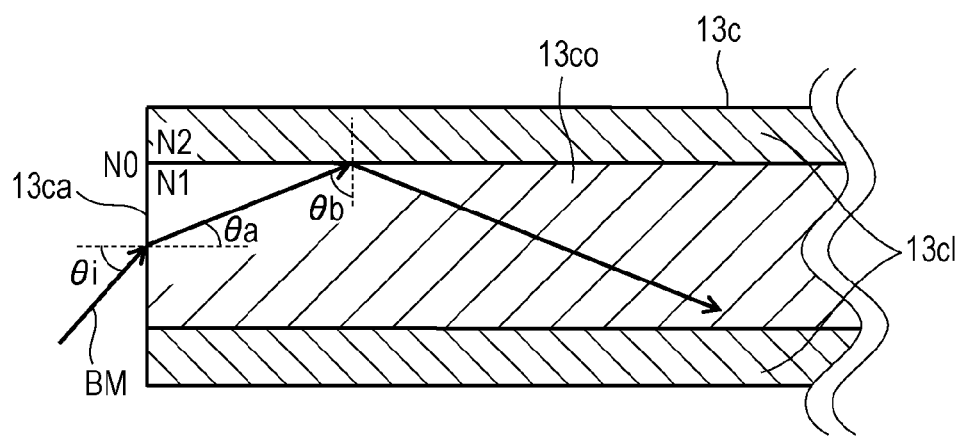
FIG. 2B is a schematic diagram illustrating a configuration of an optical fiber of a typical image pickup apparatus, and a state in which light propagates inside the optical fiber.

FIG. 2B illustrates a configuration of the optical fiber 13c and a state in which light propagates inside the optical fiber 13c. The optical fiber 13c consists of a core 13co and a clad 13cl. The image pickup light BM enters into the light incident surface 13a at an incidence angle $\theta i$, and propagates inside the core 13co at an emission angle $\theta a$. The propagation light enters into an interface between the core 13co and the clad 13cl at an incidence angle $\theta b$. Here, the propagation light propagates inside the core 13co by the total reflection on the interface between the core 13co and the clad 13cl. For that propagation, the incidence angle $\theta b$ should satisfy Expression (1):

$$\theta b > \sin^{-1}\left(\frac{N2}{N1}\right). \qquad \text{Expression (1)}$$

In Expression (1), N1 is a refractive index of the core 13co, and N2 is a refractive index of the clad 13cl.

As illustrated in FIGS. 2A and 2B, when the light incident surface 13ca of the optical fiber 13c is disposed to be perpendicular to the axial direction of the optical fiber, the numerical aperture NA of the optical fiber 13c may be expressed by Expression (2):

$$NA = N0 \cdot \sin \theta i = \sqrt{N1^2 - N2^2} \qquad \text{Expression (2).}$$

In Expression (2), N0 is a refractive index of a medium that the light incident surface 13ca touches (in the present embodiment, the air N0=1.000), and $\theta i$ is an incidence angle of the image pickup light BM with respect to the light incident surface 13ca of the optical fiber 13c as described above.

Recent rapid development in a glass material that constitutes the optical fiber 13c has produced a glass material of which refractive index difference between the core 13co and the clad 13cl is very large. Thus, a numerical aperture NA of the optical fiber has increased to be as many as NA=1.0. An exemplary configuration in which NA=1.0 is as follows: a refractive index of the core 13co is N1=1.820, and a refractive index of the clad 13cl is N2=1.495. Since the configuration of NA=1.0 necessarily satisfies Expression (1), transmittance of the optical fiber may be increased by using such a material.

Figure 3A:
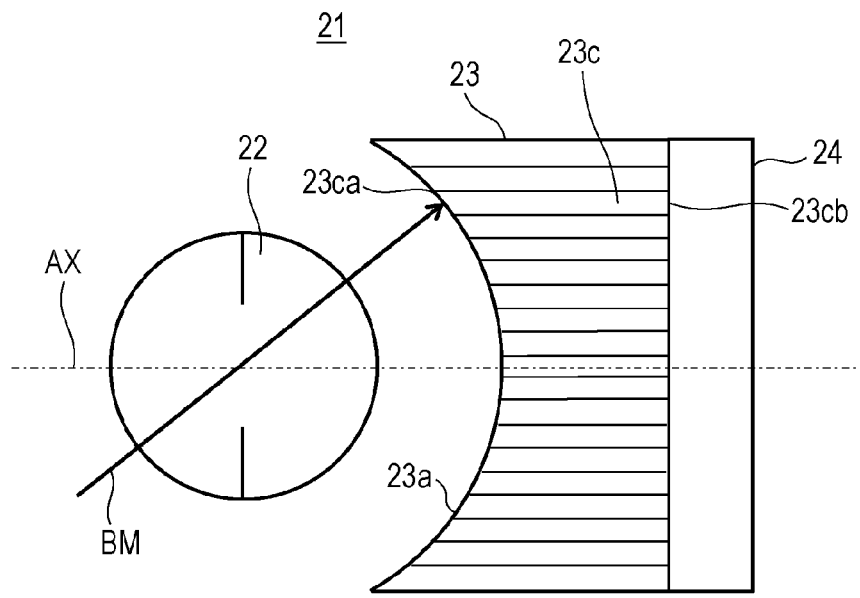
FIG. 3A is a schematic diagram illustrating an exemplary related art image pickup apparatus.

However, the optical fiber bundle 13 illustrated in FIGS. 2A and 2B is difficult to manufacture because it is necessary to arrange each optical fiber 13c at a desired position. Therefore, employing a configuration of an image pickup apparatus 21 as illustrated in FIG. 3A is considered. FIG. 3A is a schematic diagram of an exemplary typical image pickup apparatus 21. The image pickup apparatus 21 includes a ball lens 22 as an imaging optical system, an optical fiber bundle 23, and a sensor 24 as an image pickup device. The optical fiber bundle 23 includes a plurality of optical fibers 23c. An axial direction of each of a plurality of optical fibers 23c is perpendicular to the sensor 24, and is parallel to the optical axis AX of the ball lens 22. In a light incident surface 23a of the optical fiber bundle 23, a light incident surface 23a of the optical fiber bundle 23 has the same shape as that of an imaging surface of the imaging optical system 12. This shape is produced by cutting the optical fiber bundle 23 so that the light incident surface 23a of the optical fiber bundle 23 becomes a substantial concave surface with respect to the ball lens 22 after a plurality of optical fibers 23c are bundled.

Figure 3B:
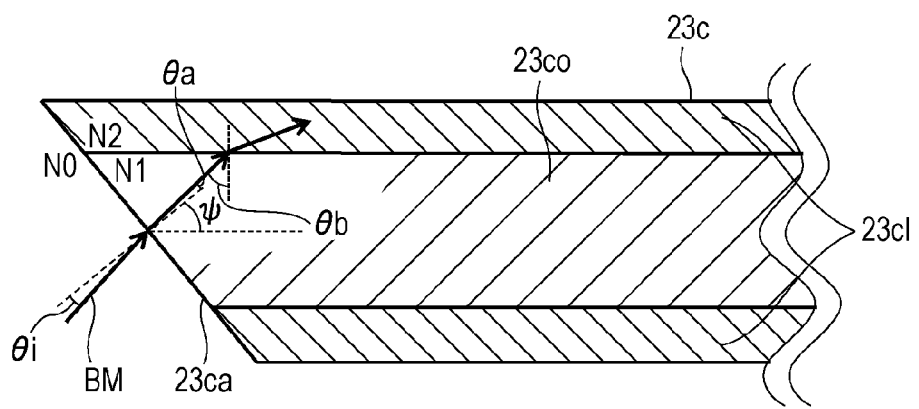
FIG. 3B is a schematic diagram illustrating a configuration of an optical fiber of an exemplary related art image pickup apparatus, and a state in which light propagates inside the optical fiber.

In such an optical fiber bundle 23, as illustrated in FIG. 3B, the light incident surface 23ca of the optical fiber 23c is inclined with respect to the axial direction of the optical fiber 23c. Specifically, the surface normal line of the light incident surface 23ca of the optical fiber 23c is inclined with respect to the axial direction of the optical fiber 23c by an angle ψ. A curvature radius of the light incident surface 23a of the optical fiber bundle 23 is several millimeters to tens of millimeters, while the pitch of each optical fiber 23c is several micrometers. Therefore, the light incident surface 23ca of the optical fiber 23c is a fine region of the light incident surface 23a of the optical fiber bundle 23 and, therefore, can be considered as an inclined plane.

In this case, the image pickup light BM enters into the light incident surface 23ca of the optical fiber 23c at the incidence angle θi, and the incidence angle θi is small compared with the case of FIG. 2B. Therefore, the angle of light emitted from the light incident surface 23ca of the optical fiber 23c and incident on the interface between the core 13co and the clad 13cl is hardly changed from the angle of the image pickup light BM. That is, the incidence angle θb with respect to the interface between the core 13co and the clad 13cl is small compared with the case of FIG. 2B, and the total reflection condition expressed by Expression (1) is no more satisfied. Therefore, the image pickup light BM enters into the clad 13cl and is emitted out of the optical fiber 23c, whereby the light does not reach the light emitting surface 23cb of the optical fiber 23c.

Inclination of the normal line of the light incident surface 23ca of the optical fiber 23c with respect to the axial direction of the optical fiber 23c is larger in the peripheral portion than in the central portion of the optical fiber bundle 23, and transmittance of the optical fiber 23c decreases in the peripheral portion of the optical fiber bundle 23. Light quantity of the received light decreases accordingly in the pixels in the peripheral portion of the image pickup device.

Figure 1C:
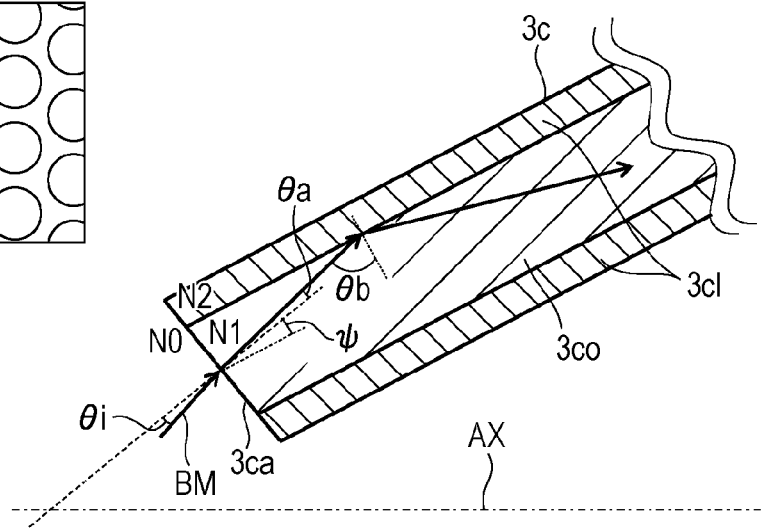
FIG. 1C is a schematic diagram illustrating an optical fiber of the image pickup apparatus according to the first embodiment.

In the image pickup apparatus 1 of the present embodiment, the axial direction of the optical fiber 3c is inclined with respect to the optical axis AX of the ball lens 2. FIG. 1C illustrates a configuration of the optical fiber 3c. By disposing the optical fiber 3c not parallel to but inclined with respect to the optical axis AX, even if the incidence angle θi of the image pickup light BM is the same as that of the configuration of FIG. 3B, the incidence angle θb with respect to the interface between the core 3co and the clad 3cl can be increased. Therefore, a decrease in transmittance of the optical fiber 3c is reduced.

Figure 4:
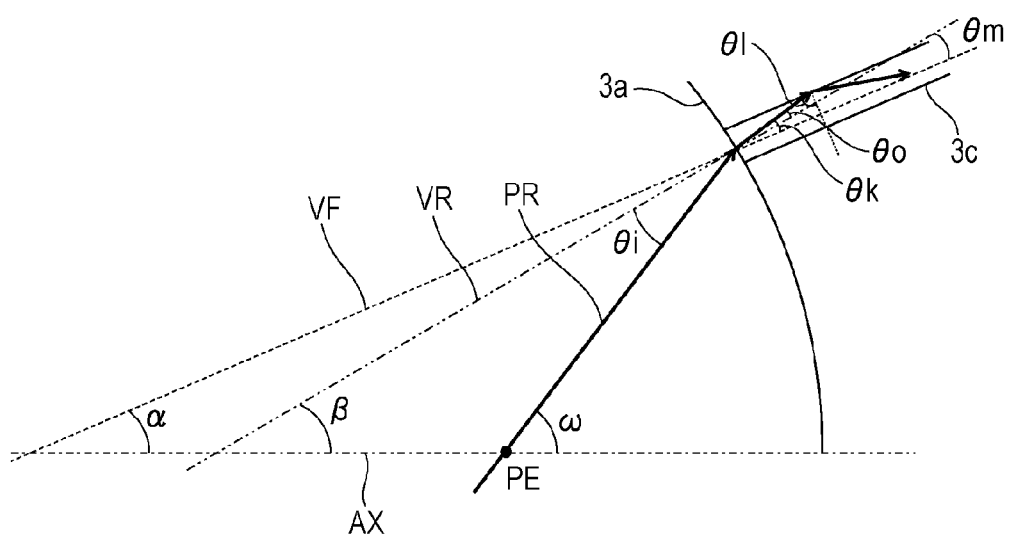
FIG. 4 is a schematic diagram illustrating an inclination angle of an optical fiber.
Figure 5A:
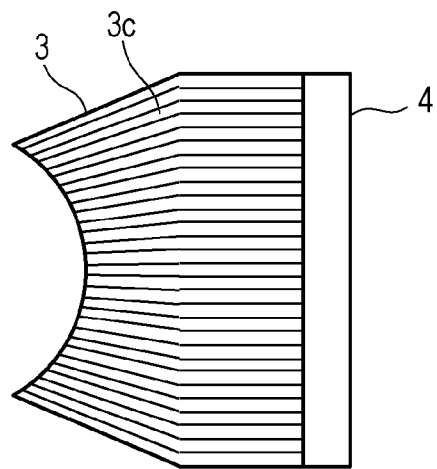
FIG. 5A is a schematic diagram illustrating an exemplary configuration of the optical fiber of the first embodiment.
Figure 5B:
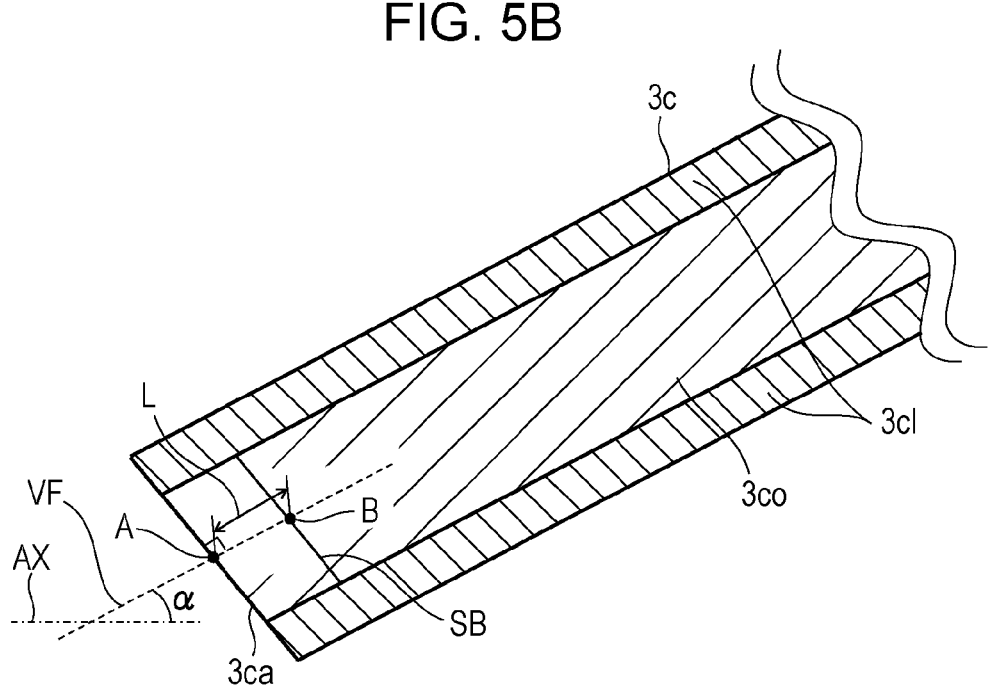
FIG. 5B is a schematic diagram illustrating an inclination angle of the optical fiber of the first embodiment.

An inclination angle α with respect to the optical axis AX of the ball lens 2 of the optical fiber 3c is described with reference to FIGS. 4 and 5. In FIG. 4, the inclination angle α is an angle made between an axis VF of the optical fiber 3c and the optical axis AX and is equal to or greater than 0.00 to less than 90.00 degrees. The optical fiber 3c of the present embodiment is a tapered optical fiber, and the thickness of the core 3co of the optical fiber 3c changes depending on the location. The shape of the optical fiber 3c may be linear or curved. In the present embodiment, as illustrated in FIG. 5A, the optical fiber 3c that constitutes the optical fiber bundle 3 may consist of a portion not parallel to the optical axis AX and a portion parallel to the optical axis AX. Therefore, the axis VF of the optical fiber 3c is defined as follows with reference to FIG. 5B. The axis VF of the optical fiber 3c is a straight line that connects the center A of a cross section of a core 3co located on the light incident surface 3ca of the optical fiber 3c and the center B of a cross section SB of a core 3co located inside the core 3co from the center A by a magnitude L of the diameter of the core 3co of the light incident surface 3ca of the optical fiber 3c.

In FIG. 4, β is an inclination angle of the light incident surface 3ca of the optical fiber 3c. Specifically, the inclination angle β is an angle made between the normal line VR of the light incident surface 3ca of the optical fiber 3c and the optical axis AX and is equal to or greater than 0.00 to less than 90.00 degrees. In the present embodiment, the optical fiber 3c is configured such that the inclination angle β is larger than the inclination angle α. That is, α<β. The light incident surface 3ca of the optical fiber 3c is a fine region with respect to the light incident surface 3a of the optical fiber bundle 3 and, therefore, is considered as a planar surface.

In FIG. 4, ω is an angle of a principal ray PR from an imaging optical system incident on the optical fiber 3c. Specifically, the angle ω is made between a straight line connecting the center PE of an exit pupil of the ball lens 2 and the center A of a core 3co located on the light incident surface 3ca of the optical fiber 3c (see FIG. 5B) and the optical axis AX, and is equal to or greater than 0.00 to less than 90.00 degrees. In the present embodiment, the principal ray PR of an angle ω greater than the inclination angle α is made to enter into the optical fiber 3c. That is, α<ω.

In the present embodiment, a decrease in transmittance of an arbitrary optical fiber 3c is reduced by configuring the optical fiber 3c such that the inclination angle α of the optical fiber 3c satisfies the condition of total reflection to the principal ray PR having the angle ω within the optical fiber 3c. Specifically, the total reflection condition is determined as follows. First, on the light incident surface 3ca of the optical fiber 3c, Expression (3) is satisfied from the Snell's law.

$$N0 \sin \theta i = N1 \sin \theta o \qquad \text{Expression (3)}$$

In Expression (3), N0 is a refractive index of a medium that the light incident surface touches (in the case of the present embodiment, air N0=1.000), and θi is an incidence angle of the principal ray PR with respect to the light incident surface 3ca of the optical fiber 3c. N1 is a refractive index of the core 3co, and θo is an angle of refraction of the principal ray PR on the light incident surface 3a. The total reflection condition on the interface between the core 3co and the clad 3cl of the optical fiber 3c is expressed by Expression (4):

$$\sin\theta l \geq \frac{N2}{N1}. \qquad \text{Expression (4)}$$

In Expression (4), N2 is a refractive index of the clad 3cl, and θl is an incidence angle of the principal ray PR refracted toward the interface between the core 3co and the clad 3cl. The angles θi, θo, and θl are expressed by Expressions (5) to (7) using α, β and ω, and the angles θk and θm used auxiliary in FIG. 4:

$$\theta i = \omega - \beta \qquad \text{Expression (5)}$$

$$\theta l + \theta k = 90.00 \text{ deg} \qquad \text{Expression (6)}$$

$$\theta k = \theta o + \theta m = \theta o + (\beta - \alpha) \qquad \text{Expression (7)}.$$

Using Expressions (3) to (7), the total reflection condition to be satisfied by the inclination angle α of the optical fiber 3c is determined by Expression (8):

$$\beta + \sin^{-1}\left[\frac{\sin(\omega - \beta)}{N1}\right] - \cos^{-1}\left(\frac{N2}{N1}\right) \leq \alpha. \qquad \text{Expression (8)}$$

In an optical fiber 3c close to the optical axis AX, the inclination angle β and the angle ω are small, and the left side of Expression (8) may be a negative value. The upper limit of the inclination angle α of the optical fiber 3c is the emission angle ω of the principal ray PR. This is because, in some manufacturing methods of the optical fiber bundle 3, it is difficult to set the inclination angle α of the optical fiber 3c to be equal to or greater than the angle ω of the principal ray when an imaging optical system of which angle of view is greater than ±47.00 degrees is used. Thus, the optical fiber 3c is configured so that the inclination angle α of the optical fiber 3c satisfies the following Expression (9):

$$\max\left\{0, \beta + \sin^{-1}\left[\frac{\sin(\omega - \beta)}{N1}\right] - \cos^{-1}\left(\frac{N2}{N1}\right)\right\} \leq \alpha < \omega. \qquad \text{Expression (9)}$$

In Expression (9), max {A, B} is a function of which greater value of A and B is employed. When the optical fiber 3c is located on the optical axis AX, the inclination angle α of the optical fiber is set to 0.00 degrees. In that case, that optical fiber 3c does not satisfy Expression (9), but other optical fibers 3c satisfy Expression (9).

A decrease in transmittance of the optical fiber 3c may be reduced by configuring such that the optical fiber 3c, of the optical fiber bundle 3, distant from the optical axis AX of the imaging optical system (i.e., the ball lens 2) has the inclination angle α that satisfies Expression (9). Thus, a decrease in light quantity of light received by the pixel of the image pickup device (i.e., the sensor 4) may be reduced.

The inclination angle α of the optical fiber 3c is set depending on the distance between the position of the light incident surface 3ca of the optical fiber 3c and the optical axis AX, i.e., depending on the emission angle ω of the principal ray PR of the image pickup light BM taken in by the optical fiber 3c and the inclination angle β of the light incident surface 3ca. This is because the greater the distance between the position of the light incident surface 3ca of the optical fiber 3c and the optical axis AX becomes, the greater the emission angle ω and the inclination angle θ that are variables of Expression (9) become. Specifically, it is desirable that the inclination angle α of the optical fiber 3c of which light incident surface 3ca is relatively distant from the optical axis AX is greater than that of the optical fiber 3c of which light incident surface 3ca is relatively close to the optical axis AX. With this configuration, the optical fiber bundle 3 may be manufactured easily.

The sensor 4 as the image pickup device may be a CMOS sensor or a CCD sensor.

In the present embodiment, the light incident surface 3a of the optical fiber bundle 3 is a spherical surface, but the invention is not limited to the same. The light incident surface 3a may be a parabolic surface or an aspheric surface. It is only necessary to use a curvature radius of a base spherical surface or a paraxial curvature radius to calculate the center of curvature of that surface.

Numerical Example 1

A Numerical Example in the image pickup apparatus of the present embodiment is shown in Table 1.

TABLE 1

| | EMISSION ANGLE ω (deg) | | | | | | |
|---|---|---|---|---|---|---|---|
| | 0.00 | 10.00 | 20.00 | 30.00 | 40.00 | 50.00 | 60.00 |
| IMAGE HEIGHT (mm) | 0.00 | 1.74 | 3.42 | 5.00 | 6.43 | 7.66 | 8.66 |
| RADIUS OF CURVATURE OF LIGHT INCIDENT SURFACE OF OPTICAL FIBER (mm) | 10.00 | 10.00 | 10.00 | 10.00 | 10.00 | 10.00 | 10.00 |
| INCLINATION ANGLE β OF LIGHT INCIDENT SURFACE OF OPTICAL FIBER (deg) | 0.00 | 10.00 | 20.00 | 30.00 | 40.00 | 50.00 | 60.00 |
| REFRACTIVE INDEX N1 OF CORE | 1.820 | 1.820 | 1.820 | 1.820 | 1.820 | 1.820 | 1.820 |
| REFRACTIVE INDEX N2 OF CLAD | 1.495 | 1.495 | 1.495 | 1.495 | 1.495 | 1.495 | 1.495 |
| VALUE OF THE RIGHTMOST SIDE OF EXPRESSION 9 (deg) | 0.00 | 10.00 | 20.00 | 30.00 | 40.00 | 50.00 | 60.00 |
| VALUE OF THE LEFTMOST SIDE OF EXPRESSION 9 (deg) | 0.00 | 0.00 | 0.00 | 0.00 | 5.23 | 15.23 | 25.23 |
| INCLINATION ANGLE α OF OPTICAL FIBER (deg) | 0.00 | 3.96 | 7.98 | 12.12 | 16.45 | 21.05 | 26.00 |

Numerical values corresponding to the principal ray at each emission angle ω of 0.00 to 60.00 degrees are shown in Table 1. The emission angle ω=0.00 degrees means that the emission angle ω is parallel to the optical axis. This means that the larger the emission angle ω becomes, the more distant the optical fiber 3c becomes from the optical axis AX. The inclination angle α of each optical fiber 3c distant from the optical axis AX (other than those of which ω=0.00 degrees) is set to satisfy Expression (9). The optical fiber bundle 3 may be manufactured easily by employing the inclination angles α of Table 1. In this Numerical Example, the center of curvature of the light incident surface 3a of the optical fiber bundle 3 and the center PE of the exit pupil of the imaging optical system 2 correspond to each other, and the emission angle ω and the inclination angle β of the light incident surface 3a of the optical fiber 3c are set to be the same value in each optical fiber 3c.

In this Numerical Example, the inclination angle α of the optical fiber 3c is set to be smaller than the upper limit and equal to or greater than the lower limit except when the emission angle ω=0.00 degrees, which means that the light is parallel to the optical axis AX, whereby Expression (9) is satisfied. Therefore, since the condition of total reflection, within the optical fiber 3c, to the principal ray PR of all the components of the image pickup light BM incident on the optical fiber bundle 3 may be satisfied, a decrease in light quantity during transmission of an image formed by the imaging optical system to the image pickup device may be reduced. The emission angle ω tends to become larger especially in a wide angle imaging optical system of which angle of view exceeds ±30.00 degrees, and a super-wide angle imaging optical system of which angle of view exceeds ±47.00 degrees. By configuring the optical fiber 3c such that the inclination angle α of the optical fiber 3c satisfies Expression (9), a decrease in transmittance of the optical fiber 3c also in the peripheral portion of the optical fiber bundle 3 of which emission angle ω is large may be reduced.

In the optical fiber bundle 3 of this Numerical Example, a diameter of the core 3co of the optical fiber 3c on the side of the light incident surface 3a is relatively small, and the diameter of the core 3co of the optical fiber 3c on the side of the light emitting surface 3b is relatively large. Therefore, since the optical fiber 3c can be inclined while keeping the distance between the optical fibers 3c uniform, the inclination angle α of the optical fiber 3c can be easily and reliably set to a desired angle.

The imaging optical system does not necessarily have to be the ball lens 2 that is point-symmetric. For example, the imaging optical system may consist of a diaphragm, and a plurality of lens unit including a front group lens disposed further toward the light incidence side than the diaphragm and a rear group lens disposed further toward the light emission side than the diaphragm. As the front group lens, an optical system in which the center of curvature of a lens surface having the strongest power of the front group lens is located near the center of the diaphragm may be used. As the rear group lens, an optical system in which the center of curvature of a lens surface having the strongest power of the rear group lens is located near the center of the diaphragm may be used. Near the center of the diaphragm refers to a range included in a sphere of which radius is the length of the wavelength of the principal ray from the center of the diaphragm. Each of the front group lens and the rear group lens may be a single lens or may consist of a plurality of lens.

As described above, according to the present embodiment, an image pickup apparatus of which a decrease in transmittance of light incident on the optical fiber distant from the optical axis is reduced may be obtained.

Second Embodiment

An image pickup apparatus (i.e., an imaging optics apparatus) of the present embodiment differs from that of the first embodiment in that all the light components of the image pickup light BM can be subject to total reflection in each optical fiber 3c of the optical fiber bundle 3. Specifically, in the second embodiment, Expression of a total reflection condition satisfied by an optical fiber 3c differs from that of the first embodiment, configurations other than that are the same as those of the first embodiment, and the configuration of the schematic diagram of the image pickup apparatus is the same as that illustrated in FIG. 1A.

Figure 6:
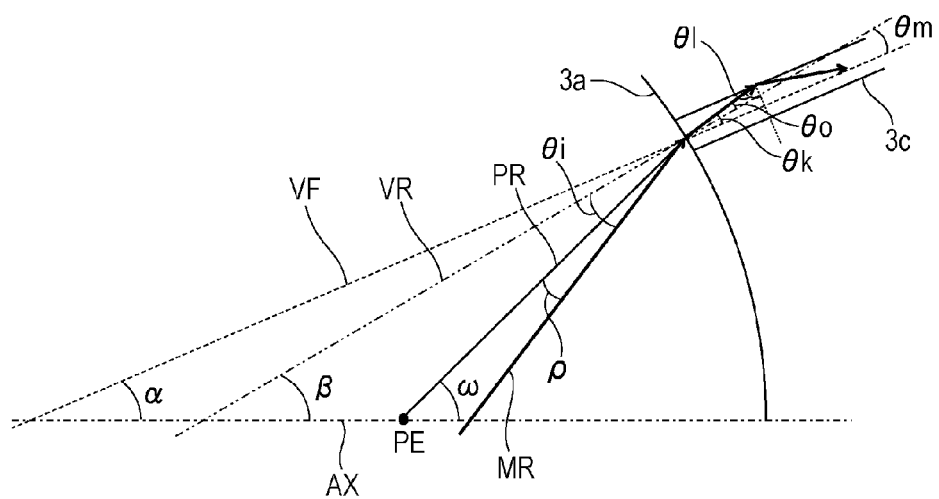
FIG. 6 is a schematic diagram illustrating an inclination angle of an optical fiber of a second embodiment.

FIG. 6 is a diagram for describing an inclination angle α of the optical fiber 3c of the present embodiment. In the present embodiment, as described above, in order that all the light components can be subject to total reflection within each optical fiber 3c of the optical fiber bundle 3, a condition for a lower marginal ray MR in addition to a principal ray PR to perform total reflection within the optical fiber 3c is considered. As the image pickup light BM, a light beam including from a lower marginal ray MR to an upper marginal ray (not illustrated) enters into a single optical fiber 3c.

The principal ray PR of the image pickup light is emitted from the center PC of an exit pupil of the imaging optical system, and is subject to image formation on an imaging surface of the imaging optical system. The lower marginal ray MR is emitted from a lower end of the exit pupil and is condensed at the same image formation point as that of the principal ray PR on the imaging surface. Here, an angle made between the principal ray PR and the lower marginal ray MR toward the image formation point is illustrated as a marginal ray angle ρ.

In order that the lower marginal ray MR is subject to total reflection within the optical fiber 3c, as is understood by comparing FIG. 6 and FIG. 4, it is only necessary to calculate the incidence angle θi of Expression (5) as, instead of ω−β, ω−β+ρ obtained by adding the marginal ray angle ρ to w−β. That is, in the present embodiment, an optical fiber 3c distant from the optical axis AX is configured so that the inclination angle α of the optical fiber 3c satisfies the following Expression (10). The inclination angle α of the optical fiber 3c located on the optical axis AX is set to 0.00 degrees as in the first embodiment.

$$\max\left\{0, \beta + \sin^{-1}\left[\frac{\sin(\omega + \rho - \beta)}{N1}\right] - \cos^{-1}\left(\frac{N2}{N1}\right)\right\} \leq \alpha < \omega \quad \text{Expression (10)}$$

A decrease in transmittance of the optical fiber 3c may further be reduced compared with the first embodiment by configuring so that the optical fiber 3c, of the optical fiber bundle 3, distant from the optical axis AX of the imaging optical system (i.e., the ball lens 2) has the inclination angle α that satisfies Expression (10). Thus, a decrease in light quantity received by the pixel of the image pickup device (i.e., the sensor 4) may further be reduced compared with the first embodiment.

Numerical Example 2

Numerical Example in the image pickup apparatus of the present embodiment is shown in Table 2.

TABLE 2

| | EMISSION ANGLE ω (deg) | | | | | | |
|---|---|---|---|---|---|---|---|
| | 0.00 | 10.00 | 20.00 | 30.00 | 40.00 | 50.00 | 60.00 |
| IMAGE HEIGHT (mm) | 0.00 | 1.74 | 3.42 | 5.00 | 6.43 | 7.66 | 8.66 |
| RADIUS OF CURVATURE OF LIGHT INCIDENT SURFACE OF OPTICAL FIBER (mm) | 10.00 | 10.00 | 10.00 | 10.00 | 10.00 | 10.00 | 10.00 |
| INCLINATION ANGLE β OF LIGHT INCIDENT SURFACE OF OPTICAL FIBER (deg) | 0.00 | 10.00 | 20.00 | 30.00 | 40.00 | 50.00 | 60.00 |
| MARGINAL RAY ANGLE ρ (deg) | 20.92 | 20.61 | 19.66 | 18.12 | 16.03 | 13.45 | 10.46 |
| REFRACTIVE INDEX N1 OF CORE | 1.820 | 1.820 | 1.820 | 1.820 | 1.820 | 1.820 | 1.820 |
| REFRACTIVE INDEX N2 OF CLAD | 1.495 | 1.495 | 1.495 | 1.495 | 1.495 | 1.495 | 1.495 |
| VALUE OF THE RIGHTMOST SIDE OF EXPRESSION 10 (deg) | 0.00 | 10.00 | 20.00 | 30.00 | 40.00 | 50.00 | 60.00 |
| VALUE OF THE LEFTMOST SIDE OF EXPRESSION 10 (deg) | 0.00 | 0.00 | 0.00 | 5.07 | 13.95 | 22.57 | 30.95 |
| INCLINATION ANGLE α OF OPTICAL FIBER (deg) | 0.00 | 4.56 | 9.24 | 14.14 | 19.43 | 25.29 | 32.00 |

Numerical values corresponding to the image pickup light at each emission angle ω of 0.00 to 60.00 degrees are shown in Table 2. The emission angle ω=0.00 degrees means that the emission angle ω is parallel to the optical axis. This means that the larger the emission angle ω becomes, the more distant the optical fiber 3c becomes from the optical axis AX. The inclination angle α of each optical fiber 3c distant from the optical axis AX (other than those of which ω=0.00 degrees) is set to satisfy Expression (10). The optical fiber bundle 3 may be manufactured easily by employing the inclination angles α of Table 2. In this Numerical Example, the center of curvature of the light incident surface 3a of the optical fiber bundle 3 and the center PE of the exit pupil of the imaging optical system 2 correspond to each other, and the emission angle ω and the inclination angle β of the light incident surface 3a of the optical fiber 3c are set to be the same value in each optical fiber 3c.

In this Numerical Example, the inclination angle α of the optical fiber 3c is set to be smaller than the upper limit and equal to or greater than the lower limit except when the emission angle ω=0.00 degrees, which means that the light is parallel to the optical axis AX, whereby Expression (10) is satisfied. In this Numerical Example, not only the principal ray PR but the lower marginal ray MR are to be subject to total reflection within the optical fiber 3c. The lower marginal ray MR enters into the optical fiber 3c with the largest angle with respect to the axial direction of the optical fiber 3c among the components of the image pickup light BM and, therefore, is a light beam the most difficult to be subject to total reflection among the components of the image pickup light BM. If the Expression (10) is satisfied, all the light beams of all the components of the image pickup light BM can be subject to total reflection on the interface between the core 3co and the clad 3cl of the optical fiber 3c, propagate inside the optical fiber 3c, and reach the image pickup device. Therefore, a decrease in transmittance of the optical fiber 3c may further be reduced, and a decrease in light quantity in the pixels in the peripheral portion of the sensor 4 may be reduced, whereby a high quality image in which brightness prevails to the peripheral angle of view may be obtained. The emission angle ω tends to become larger especially in a wide angle imaging optical system of which angle of view exceeds ±30.00 degrees, and a super-wide angle imaging optical system of which angle of view exceeds ±47.00 degrees. By configuring the optical fiber 3c such that the inclination angle α of the optical fiber 3c satisfies Expression (10), a decrease in transmittance of the optical fiber 3c also in the peripheral portion of the optical fiber bundle 3 of which emission angle ω is large may be reduced significantly.

Numerical Example 3

Another Numerical Example in the image pickup apparatus of the present embodiment is shown in Table 3.

TABLE 3

| | EMISSION ANGLE ω (deg) | | | | | | |
|---|---|---|---|---|---|---|---|
| | 0.00 | 10.00 | 20.00 | 30.00 | 40.00 | 50.00 | 60.00 |
| IMAGE HEIGHT (mm) | 0.00 | 2.26 | 4.45 | 6.50 | 8.36 | 9.96 | 11.26 |
| RADIUS OF CURVATURE OF LIGHT INCIDENT SURFACE OF OPTICAL FIBER (mm) | 13.00 | 13.00 | 13.00 | 13.00 | 13.00 | 13.00 | 13.00 |
| INCLINATION ANGLE β OF LIGHT INCIDENT SURFACE OF OPTICAL FIBER (deg) | 0.00 | 7.70 | 15.47 | 23.37 | 31.47 | 39.82 | 48.47 |
| MARGINAL RAY ANGLE ρ (deg) | 20.92 | 20.61 | 19.66 | 18.12 | 16.03 | 13.45 | 10.46 |
| REFRACTIVE INDEX N1 OF CORE | 1.820 | 1.820 | 1.820 | 1.820 | 1.820 | 1.820 | 1.820 |

TABLE 3-continued

| | EMISSION ANGLE ω (deg) | | | | | | |
|---|---|---|---|---|---|---|---|
| | 0.00 | 10.00 | 20.00 | 30.00 | 40.00 | 50.00 | 60.00 |
| REFRACTIVE INDEX N2 OF CLAD | 1.495 | 1.495 | 1.495 | 1.495 | 1.495 | 1.495 | 1.495 |
| VALUE OF THE RIGHTMOST SIDE OF EXPRESSION 10 (deg) | 0.00 | 10.00 | 20.00 | 30.00 | 40.00 | 50.00 | 60.00 |
| VALUE OF THE LEFTMOST SIDE OF EXPRESSION 10 (deg) | 0.00 | 0.00 | 0.00 | 1.90 | 9.90 | 17.77 | 25.57 |
| INCLINATION ANGLE α OF OPTICAL FIBER (deg) | 0.00 | 3.96 | 7.98 | 12.12 | 16.45 | 21.05 | 26.00 |

Numerical values corresponding to the image pickup light at each emission angle ω of 0.00 to 60.00 degrees are shown in Table 3. The emission angle ω=0.00 degrees means that the emission angle ω is parallel to the optical axis. The larger the emission angle ω becomes, the more distant the optical fiber $3c$ becomes from the optical axis AX. The inclination angle α of each optical fiber $3c$ distant from the optical axis AX (other than those of which ω=0.00 degrees) is set to satisfy Expression (10).

In this Numerical Example, the imaging surface of the imaging optical system 2 is formed as a spherical surface having the center of curvature located further toward the object than the center PE of the exit pupil of the imaging optical system 2. To conform to the shape of the imaging surface of the imaging optical system 2, the light incident surface $3a$ of the optical fiber bundle 3 is formed as a spherical surface having the center of curvature located further toward the object than the center PE of the exit pupil of the imaging optical system 2. That is, not $\beta=\omega$ but $\beta<\omega$. Specifically, the curvature radius of the light incident surface $3a$ of the optical fiber bundle 3 is set to 13.00 mm while the distance from the center PE of the exit pupil of the imaging optical system 2 to the light incident surface $3a$ of the optical fiber bundle 3 is 10.00 mm. Therefore, the center of curvature of the light incident surface $3a$ of the optical fiber bundle 3 is located further toward the object than the center PE of the exit pupil of the imaging optical system 2 by 3.00 mm.

In Numerical Example 2, as $\beta=\omega$, the principal ray PR enters into the light incident surface $3ca$ of the optical fiber $3c$ at a right angle, and passes through the optical fiber $3c$ keeping the emission angle ω without being refracted on the light incident surface $3ca$. The marginal ray MR is refracted on the light incident surface $3ca$ of the optical fiber $3c$, but the angle of refraction is small. In this case, the incidence angle with respect to the core $3co$ and the clad $3cl$ of the optical fiber $3c$ is an acute angle and, the inclination angle α of the optical fiber $3c$ should be set to be large to satisfy the total reflection condition.

If $\beta<\omega$ as in this Numerical Example, the principal ray PR may be refracted in the direction to approach the inclination angle α of the optical fiber $3c$ on the light incident surface $3a$ of the optical fiber $3c$. The marginal ray MR may also be refracted on the light incident surface $3a$ of the optical fiber $3c$, may be refracted in the direction to approach the inclination angle α of the optical fiber $3c$. Thus, the incidence angle with respect to the core $3co$ and the clad $3cl$ of the optical fiber $3c$ becomes an obtuse angle that easily satisfies the total reflection condition, and it is possible to set the inclination angle α of the optical fiber $3c$ to be small.

In this Numerical Example, the inclination angle α of the optical fiber $3c$ is always set to be smaller than the upper limit and equal to or greater than the lower limit except when emission angle ω=0.00 degrees, which means that the light is on the optical axis, whereby Expression (10) is satisfied. Thus, a decrease in transmittance of the optical fiber $3c$ may further be reduced.

As described above, according to the present embodiment, an image pickup apparatus of which a decrease in transmittance of light entering into the optical fiber distant from the optical axis is reduced may be obtained.

Third Embodiment

Figure 7:
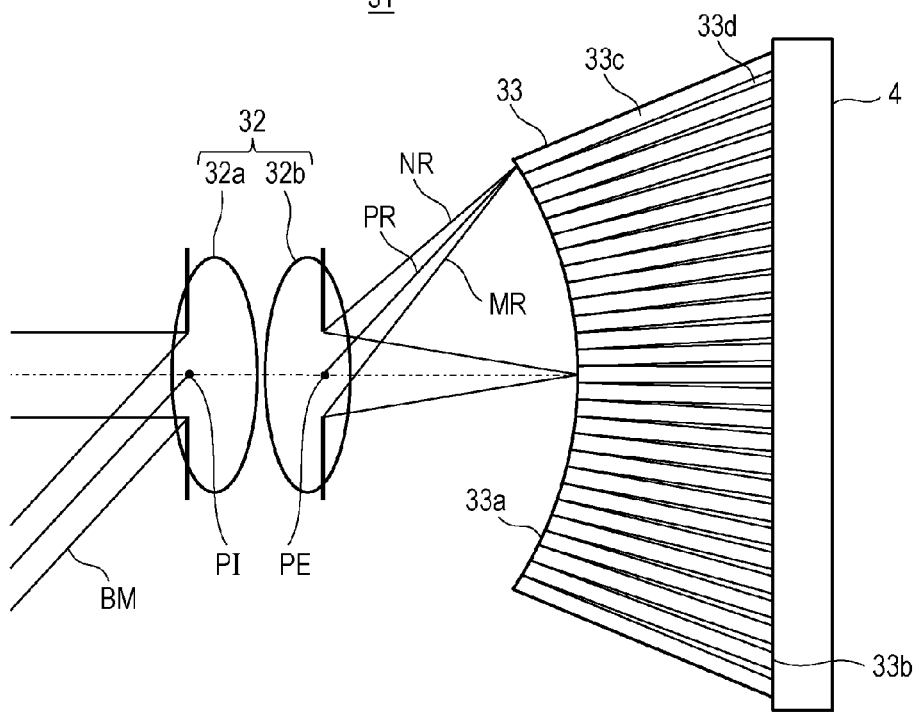
FIG. 7 is a schematic diagram illustrating an exemplary image pickup apparatus according to a third embodiment.

FIG. 7 is a schematic diagram illustrating an exemplary image pickup apparatus (i.e., an imaging optics apparatus) 31 according to the present embodiment. The image pickup apparatus of the present embodiment differs from the image pickup apparatus 1 of the second embodiment in the configuration of the imaging optical system and in the configuration of the optical fiber bundle as an image transmitting unit.

Specifically, an imaging optical system 32 in the image pickup apparatus 31 of the present embodiment is formed by a plurality of lenses 32a and 32b. The imaging optical system 32 causes the image pickup light BM incident on a pupil PI to be emitted from an exit pupil PE.

An optical fiber bundle 33 is formed by a plurality of optical fibers $33c$. In the optical fiber $33c$, the diameter of the core on the side of a light incident surface $33a$ and the diameter of the core on the side of a light emitting surface $33b$ are the same. The optical fibers $33c$ are arranged densely on the side of the light incident surface $33a$ side of the optical fiber bundle 3. Gaps $33d$ are formed on the side of the light emitting surface $33b$ so that the optical fibers $33c$ are arranged less densely. Therefore, the axial direction of the optical fiber $33c$ is inclined toward the optical axis AX of the imaging optical system 32.

Also in this case, it is only necessary to configure each optical fiber $33c$ such that an inclination angle α of an optical fiber $33c$ distant from the optical axis AX satisfies Expression (10). All the light beams of all the components of the image pickup light BM can be subject to total reflection on the interface between the core $3co$ and the clad $3cl$ of the optical fiber $33c$, propagate inside the optical fiber $33c$, and reach the image pickup device. However, the position on the optical axis AX of the imaging optical system is set to be the inclination angle α=0.00 degrees of the optical fiber and is excluded.

Numerical Example 4

A Numerical Example in the image pickup apparatus of the present embodiment is shown in Table 4.

TABLE 4

| | EMISSION ANGLE ω (deg) | | | | | | |
|---|---|---|---|---|---|---|---|
| | 0.00 | 10.00 | 20.00 | 30.00 | 40.00 | 50.00 | 60.00 |
| IMAGE HEIGHT (mm) | 0.00 | 3.47 | 6.84 | 10.00 | 12.86 | 15.32 | 17.32 |
| RADIUS OF CURVATURE OF LIGHT INCIDENT SURFACE OF OPTICAL FIBER (mm) | 20.00 | 20.00 | 20.00 | 20.00 | 20.00 | 20.00 | 20.00 |
| INCLINATION ANGLE β Of LIGHT INCIDENT SURFACE OF OPTICAL FIBER (deg) | 0.00 | 5.02 | 10.15 | 15.52 | 21.25 | 27.48 | 34.34 |
| MARGINAL RAY ANGLE ρ (deg) | 20.92 | 20.61 | 19.66 | 18.12 | 16.03 | 13.45 | 10.46 |
| REFRACTIVE INDEX N1 OF CORE | 1.820 | 1.820 | 1.820 | 1.820 | 1.820 | 1.820 | 1.820 |
| REFRACTIVE INDEX N2 OF CLAD | 1.495 | 1.495 | 1.495 | 1.495 | 1.495 | 1.495 | 1.495 |
| VALUE OF THE RIGHTMOST SIDE OF EXPRESSION 10 (deg) | 0.00 | 10.00 | 20.00 | 30.00 | 40.00 | 50.00 | 60.00 |
| VALUE OF THE LEFTMOST SIDE OF EXPRESSION 10 (deg) | 0.00 | 0.00 | 0.00 | 0.00 | 4.74 | 11.54 | 18.47 |
| INCLINATION ANGLE α OF OPTICAL FIBER (deg) | 0.00 | 3.25 | 6.52 | 9.82 | 13.17 | 16.57 | 20.00 |

Numerical values corresponding to the image pickup light at each emission angle ω of 0.00 to 60.00 degrees are shown in Table 4. The emission angle ω=0.00 degrees means that the emission angle ω is parallel to the optical axis. This means that the larger the emission angle ω becomes, the more distant the optical fiber 3c becomes from the optical axis AX. The inclination angle α of each optical fiber 33c distant from the optical axis AX (other than those of which ω=0.00 degrees) is set to satisfy Expression (10). The optical fiber bundle 33 may be manufactured easily by employing the inclination angles α of Table 4. As in Numerical Example 3, the light incident surface 33a of the optical fiber bundle 33 is formed as a spherical surface having the center of curvature located further toward the object than the center PE of the exit pupil of the imaging optical system 32. That is, β<ω.

In this Numerical Example, the inclination angle α of the optical fiber 33c is set to be smaller than the upper limit and equal to or greater than the lower limit all the time except when the emission angle ω=0.00 degrees, which means that the light is parallel to the optical axis AX, whereby Expression (10) is satisfied.

The optical fiber bundle 33 of the present embodiment employs linear optical fibers 33c. Therefore, on the light incident surface 33a of the optical fiber bundle 33, the pitch of the optical fiber 33c is substantially uniform in the central portion and in the peripheral portion, and image height dependence of light quantity of light incident on the image pickup device may be lowered by setting light quantity of light incident on the optical fiber 33c to be substantially the same. Thus, a high quality image with less decrease in light quantity in the peripheral portion may be obtained.

If air is disposed in the gaps 33d between the optical fibers 33c, the optical fiber bundle 33 may be moved arbitrarily at locations except for the region near the light incident surface 33a and, therefore, a flexible optical fiber bundle 33 may be obtained. The flexible optical fiber bundle 33 is applicable to, for example, a fiberscope.

As described above, according to the present embodiment, an image pickup apparatus of which a decrease in transmittance of light entering into the optical fiber distant from the optical axis is reduced may be obtained.

The present invention is applicable to a product that uses an image pickup apparatus, such as a digital camera, a digital camcorder, a camera for a mobile phone, a monitoring camera, and a fiberscope.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-125724, filed Jun. 18, 2014 which is hereby incorporated by reference herein in its entirety.

What is claimed is:

1. An image pickup apparatus comprising:
an imaging optical system;
an image pickup device; and
an optical fiber bundle constituted by a plurality of optical fibers configured to guide light from the imaging optical system to the image pickup device,
wherein
a light incident surface of the optical fiber bundle is a concave surface with respect to the imaging optical system,
an optical fiber distant from an optical axis of the imaging optical system among the plurality of optical fibers satisfies the following Expression:

$$\beta + \sin^{-1}\left[\frac{\sin(\omega - \beta)}{N1}\right] - \cos^{-1}\left(\frac{N2}{N1}\right) \leq \alpha < \omega$$

where α is an inclination angle of the optical fiber with respect to the optical axis of the imaging optical system, β is an inclination angle of the light incident surface of the optical fiber with respect to the optical axis of the imaging optical system, ω is an angle, with respect to the optical axis of the imaging optical system, of a principal ray from the imaging optical system incident on the optical fiber, N1 is a refractive index of a core of the optical fiber, and N2 is a refractive index of a clad of the optical fiber.

2. The image pickup apparatus according to claim 1, wherein the optical fiber distant from the optical axis of the imaging optical system satisfies the following Expression:

$$\beta + \sin^{-1}\left[\frac{\sin(\omega + \rho - \beta)}{N1}\right] - \cos^{-1}\left(\frac{N2}{N1}\right) \le \alpha < \omega$$

where $\rho$ is an angle, with respect to the optical axis of the imaging optical system, of a marginal ray from the imaging optical system incident on the optical fiber.

3. The image pickup apparatus according to claim 1, wherein the optical fiber distant from the optical axis of the imaging optical system satisfies $\beta < \omega$.

4. The image pickup apparatus according to claim 1, wherein the optical fiber bundle is disposed such that a center of curvature of the light incident surface is located further toward an object than the center of an exit pupil of the imaging optical system.

5. The image pickup apparatus according to claim 1, wherein the cores of the plurality of optical fibers are arranged in a grid pattern in a cross section parallel to the image pickup device.

6. The image pickup apparatus according to claim 1, wherein an optical fiber close to the optical axis of the imaging optical system and an optical fiber distant from the optical axis of the imaging optical system are different in inclination angles of the optical fiber with respect to the optical axis of the imaging optical system.

7. The image pickup apparatus according to claim 1, wherein the optical fiber distant from the optical axis of the imaging optical system has a greater inclination angle of the optical fiber with respect to the optical axis of the imaging optical system in an axial direction than that of the optical fiber close to the optical axis of the imaging optical system.

8. The image pickup apparatus according to claim 1, wherein the inclination angle of the optical fiber with respect to the optical axis of the imaging optical system is an angle made between a straight line connecting the center of a core located on the light incident surface of the optical fiber and the center of a cross section of a core located inside the core from the center by a magnitude of a diameter of the core of the light incident surface of the optical fiber, and the optical axis of the imaging optical system, and the angle is equal to or greater than 0.00 to less than 90.00 degrees.

9. The image pickup apparatus according to claim 1, wherein an inclination angle of an incident surface of the optical fiber with respect to the optical axis of the imaging optical system is an angle made between the normal line of the light incident surface of the optical fiber and the optical axis of the imaging optical system, and the angle is equal to or greater than 0.00 to less than 90.00 degrees.

10. The image pickup apparatus according to claim 1, wherein an angle of a principal ray from the imaging optical system incident on the optical fiber with respect to the optical axis of the imaging optical system is an angle made between a straight line connecting the center of the exit pupil of the imaging optical system and the center of a core located on the light incident surface of the optical fiber and the optical axis of the imaging optical system, and the angle is equal to or greater than 0.00 to less than 90.00 degrees.

11. The image pickup apparatus according to claim 1, wherein
the imaging optical system includes a diaphragm, a front group lens disposed further toward the light incidence side than the diaphragm, and a rear group lens disposed further toward the light emission side than the diaphragm, and
a center of curvature of a lens surface of the front group lens having the strongest power is located on the optical axis of the imaging optical system near the center of the diaphragm.

12. The image pickup apparatus according to claim 11, wherein a center of curvature of a lens surface of the rear group lens having the strongest power is located near the center of the diaphragm.

13. The image pickup apparatus according to claim 1, wherein the imaging optical system is point-symmetric.

* * * * *